(12) United States Patent
Suchanec et al.

(10) Patent No.: US 6,512,090 B1
(45) Date of Patent: Jan. 28, 2003

(54) ASPHALT EMULSION CONTAINING SOLIDIFIED PYROLYTIC WOOD TAR OIL

(75) Inventors: Richard Robert Suchanec, County of New Castle, DE (US); Norman Leroy Kennedy, County of McIntosh, GA (US)

(73) Assignee: Hercules Incorporated, Wilmington, DE (US)

( * ) Notice: Subject to any disclaimer, the term of this patent is extended or adjusted under 35 U.S.C. 154(b) by 77 days.

(21) Appl. No.: 09/713,401

(22) Filed: Nov. 15, 2000

(51) Int. Cl.7 .................................................. C09F 1/00
(52) U.S. Cl. ...................... 530/210; 106/220; 106/221; 106/225; 106/713; 524/72; 530/211; 530/500
(58) Field of Search ................................ 106/220, 221, 106/225, 713; 524/72; 530/210, 211, 500

(56) References Cited

U.S. PATENT DOCUMENTS

| 2,221,540 | A | 11/1940 | Hall | 260/107 |
|---|---|---|---|---|
| 2,628,918 | A | 2/1953 | Wilson et al. | 106/238 |
| 2,684,300 | A | 7/1954 | Wilson et al. | 92/3 |
| 3,854,969 | A | 12/1974 | Zwahlen | 106/176 |
| 4,540,635 | A | 9/1985 | Ronge et al. | 428/498 |
| 4,876,108 | A | 10/1989 | Underwood et al. | 426/650 |
| 5,201,944 | A | 4/1993 | Nakata et al. | 106/144 |
| 5,656,733 | A | 8/1997 | Suchanec | 530/500 |
| 5,668,197 | A | * 9/1997 | Schilling | 524/59 |
| 5,792,340 | A | 8/1998 | Freel et al. | 280/127 |
| 5,853,548 | A | 12/1998 | Piskorz et al. | 201/7 |
| 5,961,786 | A | 10/1999 | Freel et al. | 202/121 |

OTHER PUBLICATIONS

"Lignin Derived Oils From the Fast Pyrolysis of Poplar Wood", by D. Radlein, J. Piskorz and D. Scott, published as Appendix 6–C in "Technical Evaluation of the Waterloo Fast Pyrolysis Process", Report of Contract File #20ST.31926–3–5026, Renewable Energy Branch, Mines and Resources Canada, 1986, pp. 174–190.

* cited by examiner

*Primary Examiner*—Samuel A. Acquah
(74) *Attorney, Agent, or Firm*—David Edwards

(57) ABSTRACT

Asphalt emulsions containing emulsifiers comprising alkali metal or ammonium salts of solidified pyrolytic wood tar oil. Resinous compositions useful as asphalt emulsifiers comprising: (a) solidified pyrolytic wood tar oil and salts thereof, and (b) rosins and salts thereof.

51 Claims, No Drawings

ASPHALT EMULSION CONTAINING SOLIDIFIED PYROLYTIC WOOD TAR OIL

FIELD OF THE INVENTION

This invention relates to asphalt emulsions and emulsifiers used in preparing asphalt emulsions.

BACKGROUND OF THE INVENTION

In the manufacture of pale wood rosin from southern pine stumpwood, crude rosin is extracted from the wood and then refined using solvent/solvent partitioning between aliphatic hydrocarbon and polar solvents. One of the by-products of this operation is a dark, high melting, largely aliphatic hydrocarbon-insoluble resin, hereinafter referred to as AHI resin. AHI resin is a thermoplastic resin that chemically is a complex mixture of high molecular weight phenolic compounds, rosin acids, neutral materials and several minor components. An AHI resin is produced as described in U.S. Pat. No. 2,221,540, which patent is incorporated herein by reference in its entirety. A preferred AHI resin is Vinsol® resin available from Hercules Incorporated, Wilmington, Delaware.

AHI resin, particularly Vinsol® resin from Hercules Incorporated, Wilmington, Del., is used in a wide variety of industrial applications including asphalt emulsions. Asphalt emulsions are used in a variety of applications such as road building, road sealing, soil stabilization, mulching, surface coating of asphalt pavements, and built-up roofs. Because the amount of wood rosin produced relative to tall oil and gum rosin is declining, the supply of AHI resin available for industrial applications is also declining. Consequently, there is a need for a material which will perform in asphalt emulsions in a manner similar to AHI resin.

U.S. Pat. No. 5,656,733 describes resinous compositions comprising lignin and polymerized rosin, and the use of such compositions as asphalt emulsifiers and air entraining agents for concrete.

SUMMARY OF THE INVENTION

This invention pertains to asphalt emulsions containing an emulsifier comprising an alkali metal or ammonium salt of solidified pyrolytic wood tar oil.

In another embodiment the invention comprises a resinous composition comprising a first component selected from the group consisting of solidified pyrolytic wood tar oil and salts thereof, and a second component selected from the group consisting of rosins and salts thereof.

In yet a third embodiment the invention pertains to a method for preparing a resinous composition comprising: combining solid ingredients comprising solidified pyrolytic wood tar oil and a rosin selected from the group consisting of natural rosin, fortified rosin, polymerized rosin, hydrogenated rosin, disproportionated rosin, modified rosin and esterified rosin; and milling the combined solid ingredients until a substantially homogeneous particulate blend is obtained.

In yet another aspect, the invention pertains to a method for preparing an asphalt emulsion comprising dissolving ingredients comprising a rosin and solidified pyrolytic wood tar oil in an aqueous solution of alkali metal or ammonium hydroxide in water to form an aqueous solution of emulsifier, mixing the aqueous solution of emulsifier with asphalt to form a mixture, and milling the mixture to form an emulsion of the asphalt.

DETAILED DESCRIPTION OF INVENTION

Solidified Pyrolytic Wood Tar Oil

The solidified wood tar oil for use in the current invention is produced by thermal destructive distillation, for example fast pyrolysis of biomass, e.g., wood. The controlled, rapid heating of the biomass material (e.g., wood) initiates depolymerization reactions in the lignin component while minimizing condensation reactions. In addition, the very short reaction times and rapid vapor quench employed in fast pyrolysis preserve the lignin polymer fragments by protecting them from prolonged exposure to high temperatures. In summary, the high intensity but very short "thermal shock" of fast pyrolysis causes the lignin component of the wood feedstock to depolymerize, yielding reactive polymer fragments in a molecular size range suitable for subsequent controlled crosslinking. Fast pyrolysis processes are described in U.S. Pat. Nos. 4,876,108; 5,792,340; 5,853,548 and 5,961,786, all of which are incorporated herein by reference in their entireties.

The rapid destructive distillation or fast pyrolysis involves the rapid heating of biomass material. Reaction temperatures of 500° to 550° C. allow maximization of the production of desired product vapors while minimizing byproduct gas and char. The product vapors are rapidly condensed and collected. This product, referred to as whole oil, bio-oil or pitch is used as a feedstock for further processing to produce solidified pyrolytic wood tar oil.

The subsequent processing of the whole oil involves the non-destructive distillation and evaporative treatment of the material. The non-destructive techniques for distillation-evaporation include wipe film evaporation, roto-evaporation, agitated film evaporation, vacuum distillation, falling film, etc. These non-destructive techniques remove or reduce the content of water, acids, odors and non-resin components by heat and/or vacuum distillation. In addition, the carefully controlled temperatures used during evaporation allow a controlled polymerization of the feedstock to occur while maintaining the reactive sites in the final product. In summary, distillation/evaporation can be controlled to product an optimized degree of crosslinking or polymerization, resulting in a solidified pyrolytic wood tar oil.

In the case of the solidified pyrolytic wood tar oil for this invention, the distillation/evaporation conditions are controlled to produce product with the following preferred property ranges: softening point (Fisher-Johns), from about 100° to about 170° C.; acid number, from about 10 to about 50; glass transition temperature ($T_g$) of from about 30° to about 100° C.; weight average molecular weight (size exclusion chromatography) of from about 1,500 to about 4,500; and number average molecular weight of from about 500 to about 1,000. More preferred property ranges are: softening point, from about 140° to about 160° C.;

acid number, from about 20 to about 30; glass transition temperature ($T_g$) of from about 70° to about 100° C.; weight average molecular weight (size exclusion chromatography) of from about 3,000 to about 4,000; and number average molecular weight of from about 750 to about 1,000.

Preferably, the solidified pyrolytic wood tar oil will contain from about 40% to about 60% of material of number average molecular weight less than about 1,000, and from about 20% to about 30% less than about 500.

Rosins

The rosins useful for the present invention can be any thermoplastic rosin, including unfortified rosin, fortified rosin, extended rosin, rosin esters, acid modified rosin esters, polymerized rosin, dimerized rosin, disproportionated rosin, hydrogenated rosin, hydrogenated rosin esters and mixtures and blends thereof. Preferred rosins for use in the invention are fortified rosins and polymerized rosin.

The rosin used in this invention can be any of the commercially available types of rosin, such as wood rosin, gum rosin, tall oil rosin, or mixtures of any two or more in their crude or refined state. Partially hydrogenated rosins and polymerized rosins, as well as rosins that have been treated to inhibit crystallization, such as by heat treatment or reaction with formaldehyde, can also be employed. Rosins for the invention preferably will have an acid number of at least about 100, more preferably at least about 150, and most preferably at least about 200.

Fortified rosin useful in this invention is the adduct reaction product of rosin and an acidic compound containing the

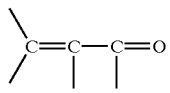

group and is derived by reacting rosin and the acidic compound at elevated temperatures of from about 150° C. to about 210° C.

The amount of acidic compound employed will be that amount which will provide fortified rosin containing from about 1% to about 16% be weight of adducted acidic compound based on the weight of the fortified rosin. Methods for preparing fortified rosin are well known to those skilled in the art. See, for example, the methods disclosed and described in U.S. Pat. Nos. 2,628,918 and 2,684,300, the disclosures of which are incorporated herein by reference.

Examples of acidic compounds containing the

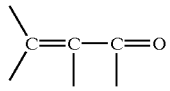

group that can be used to prepare the fortified rosin include the α,β-unsaturated organic acids and their available anhydrides, specific examples of which include fumaric acid, maleic acid, maleic anhydride, itaconic acid, itaconic anhydride, citraconic acid, citraconic anhydride and acrylic acid. Mixtures of acids can be used to prepare the fortified rosin if desired. Thus for example, a mixture of the acrylic acid adduct of rosin and the fumaric acid adduct can be used in the invention. Also, fortified rosin that has been hydrogenated after adduct formation can be used.

For use in the present invention fumaric acid and maleic anhydride are preferred, and fumaric acid is most preferred. When fumaric acid is employed as the fortifying agent, the preferred amount of fumaric acid employed will be that amount which will provide fortified rosin containing from about 1% to about 16% by weight of combined or adducted fumaric acid based on the weight of the fortified rosin. More preferably, the amount employed will provide fortified rosin containing from about 1% to about 10% by weight of adducted fumaric acid, and most preferably from about 1 % to about 5% by weight fumaric acid.

Various rosin esters of a type well known to those skilled in the art can also be used in the present invention. Esterified rosins comprise esters formed from any of the above mentioned rosins and an alcohol. Suitable exemplary rosin esters may be rosin esterified as disclosed in the U.S. Pat. Nos. 4,540,635, and 5,201,944, the disclosures of which are incorporated herein by reference. Suitable alcohols include polyhydric alcohols such as ethylene glycol, glycerol, diethylene glycol, triethylene glycol, pentaerythritol, 1,4-butanediol, sorbitol, and mannitol, aminoalcohols such as triethanolamine, triisopropanolamine, and tributanolamine, and polyethylene and polypropylene glycols.

Polymerized rosin useful in this invention is manufactured by acid catalyzed polymerization of rosin. It comprises predominantly dimeric rosin acids and is generally available as a mixture of dimerized and monomeric rosin acids. Commercially available polymerized rosin comprises a mixture of about 30 to about 90 wt. percent rosin dimer and about 10 to about 70 wt. percent rosin acids. The preferred polymerized rosin for this invention comprises a mixture of from about 30 to about 50 wt. percent dimerized rosin. The most preferred polymerized rosin is Poly-Pale® resin available from Hercules Incorporated, Wilmington, Del.

The asphalt emulsions of this invention contain an emulsifier comprising an alkali metal or ammonium salt of solidified pyrolytic wood tar oil. Preferably, the emulsifier will further comprise an alkali metal or ammonium salt of a rosin as described above, preferably fumaric acid fortified rosin or polymerized rosin. The asphalt emulsifiers are generally used at a level of from about 1 to about 2 weight percent based on the total weight of the emulsion.

In the preferred case, i.e., when an alkali metal or ammonium salt of a rosin is used together with solidified pyrolytic wood tar oil, the ratio of solidified pyrolytic wood tar oil to the rosin or mixture of rosins on a weight basis is from about 1:3 to about 3:1. Preferably the ratio is from about 1:2 to about 2:1, and more preferably from about 1:1.5 to about 1.5:1.

A preferred method for preparing the resin composition for use as an asphalt emulsifier comprises blending and mixing the solidified pyrolytic wood tar oil, the rosin or rosins, as well as any additional ingredients, in the form of lumps, flakes or powders, followed by grinding or milling the ingredients under conditions ensuring good mixing until a homogeneous mixture is obtained. Any high shear mixers suitable for blending solids are usable for this purpose. The resin composition prepared in this way may be converted into an asphalt emulsifier by solution of the blended composition in aqueous alkali metal or ammonium hydroxide.

Alternatively, the emulsifier may be prepared without the solid blending step by separately dissolving the ingredients in an aqueous solution of alkali metal or ammonium hydroxide to form an aqueous solution comprising a salt.

In most case the emulsifier solution will be used in the form of the aqueous solution. However, if desired, the water can be removed from the aqueous solution to form a solid, substantially dry salt. Preferred methods of water removal are distillation and spray drying.

The alkali metal for use in preparing the emulsifiers of the invention is selected from the group consisting of lithium, sodium and potassium. The preferred alkali metal is sodium.

Thus the resinous compositions of this invention may be in free acid form, in the form of a salt of an alkali metal or ammonium, or as mixtures of both. In the free acid form, properties of the compositions which are usually measured are the acid number and the Ring & Ball softening point. In the free acid form, the acid number of the resinous compositions of this invention is preferably from about 100 to about 130, more preferably from about 110 to about 120, and the Ring & Ball softening point is preferably from about 110° C. to about 140° C. and more preferably from about 120° C. to about 130° C.

This invention is illustrated by the following examples, which are exemplary only and not intended to be limiting. All percentages, parts, etc., are by weight, unless otherwise indicated.

Materials and Procedures

Softening points of solidified pyrolytic wood tar oil were determined on a Fisher-Johns Melting Point Apparatus. Softening points of all other materials were Ring & Ball softening points, determined by ASTM method E-28(1992). The acid number of a material is defined as the number of milligrams of KOH required to neutralize 1 gram of material.

Solidified pyrolytic wood tar oil: Wood was pyrolyzed at 500–550° C. by the methods described in U.S. Pat. No. 5,792,340, which is incorporated herein by reference in its entirety. The bio-oil from the pyrolysis system was then heated at 150–250° C. under vacuum in a wiped film evaporator until the product solidified pyrolytic wood tar oil had a Fisher Johns softening point of 130° C.

Polymerized rosin: Poly-Pale® resin, available from Hercules Incorporated, Wilmington, Del. contains approximately 40 wt. % rosin dimer and 60 wt. % monomeric rosin AHI resin: Vinsol® resin obtained from Hercules Incorporated, Wilmington, Del., acid number 90–105, Ring & Ball softening point 103–123° C.

Fumaric acid adduct of rosin: For preparation of the fumaric acid adduct of rosin, gum rosin was heated to 170° C. and then the desired quantity of fumaric acid was added. The resulting mixture was heated to 200° C. and stirred for about 2 hours. In the examples presented herein the amount of fumaric acid was 4% by weight of the rosin. The acid number of the product was 196, and the Ring & Ball softening point 97° C.

EXAMPLES

For testing of the emulsifier compositions, solid ingredients as provided in the Tables below were blended in a laboratory high shear mixer, and the resulting particulate blended material was converted to an aqueous solution containing about 27 wt. % of the emulsifier. The approximately 27% solutions were prepared as follows.

To 30 gal. of water was added 4 lbs. of 25% aqueous sodium hydroxide solution or 5.6 lbs. of 25% aqueous potassium hydroxide solution. To this solution was then added with vigorous stirring 100 lbs. of pulverized emulsifier. The stirring was continued for about 10 minutes. When the particles of emulsifier were thoroughly dispersed, 40 lbs. of 25% sodium hydroxide solution or 56 lbs. of 25% potassium hydroxide solution were added, and stirring was continued for 20 to 30 minutes until the solution had a uniform appearance. The resulting solution was approximately 27% solids and was diluted further with water to any lower solids content desired.

The soaps described in the table below were tested at levels of 2.8 wt. % based on the total weight of the emulsion. A sodium salt of AHI resin available as Vinsol® Resin from Hercules Incorporated, Wilmington, Del., was utilized as a control. Vinsol® Resin soaps are widely used commercially as asphalt emulsifiers.

The solutions, hereinafter referred to as soap solutions, prepared as described above, were transferred to a soap tank attached to a Charlotte G-5, 5405 rpm colloid mill. Tolerance for this Charlotte mill is fixed at 0.69 mm. The asphalt used was EBS (Emulsion Base Stock) X-Hard from Shell Oil Co. During milling, the temperature of the emulsion ranged from 138° C. to 143° C. at 61 % residual asphalt solids. The soap solution temperature ranged from 43°–49° C. The emulsion output temperature ranged from 84° C. to 89° C.

Testing of the emulsions and of the dried emulsion residues was carried out by the following tests:

COMPOSITION TESTS

ASTM D244 (1993): Residue by Evaporation

Measures percent residual asphalt solids in emulsion

CONSISTENCY TESTS

ASTM D244 (1993): Viscosity at 25° C.

Emulsion viscosity reported as SFS(Saybolt Furol Seconds) at the specified temperature

STABILITY TESTS

ASTM D244 (1993): Settlement

Measures settlement of emulsified asphalt on 1 day and 5 day storage

ASTM D244 (1993): Cement Mixing

Measures the chemical stability, percent break, between emulsifier and asphalt, e.g. the stability of the emulsion when it mixes with and coats mineral aggregate ASTM D244 (1993): Sieve Test Measures amount of coalesced asphaltic material that is present in emulsion

EXAMINATION OF RESIDUE

ASTM D5 (1993): Penetration

Determination of the penetration of semi-solid and solid bituminous materials. Measures hardness of the asphalt ASTM D113 (1993): Ductility Measured by elongation before break of a briquette specimen pulled apart at specified speed and temperature.

ASTM D36 (1989): Softening Point, Ring & Ball Method

Determination of softening point of bitumen in the range from 30° C. to 157° C.

Results for the emulsion tests are presented in Tables 1 and 2 below.

TABLE 1[1]

| Test Results | Example 1 AHI Resin[1] (control) | Example 2 50/50 Rosin Fumaric Acid Adduct[3]/SPWTO | Example 3 50% SPWTO, 35% Poly-Pale, 15% Rosin | ASTM Specifications |
|---|---|---|---|---|
| Soap pH | 11.8 | 11.2 | 11.1 | na |
| Residue, % | 60.9 | 59.7 | 60.5 | 57 min. |
| Sieve, % | 0 | 0.015 | 0 | 0.1 max. |
| Viscosity (SFS), 25° C. | 38 | 36 | 30 | 20–100 |
| Cement Mixing | 0 | 0.12 | 0.03 | 2.0 max. |
| 1 Day Settlement, % | −0.3 | 0 | 0 | 1.0 max. |
| Penetration, 100 g, 5 sec, 25° C. | 46 | 45 | 46 | 40–90 |
| Softening Point, ° C. | 53 | 52.4 | 51 | na |
| Ductility, 25° C. | 105+ | 57 | 83 | 40 min. |

[1]Formulations contain 61 wt. % asphalt.

TABLE 2[1]

| Test Results | Example 4 60% SPWTO, 28% Poly-Pale, 12% Rosin | Example 5 40% SPWTO, 42% Poly-Pale, 18% Rosin | Example 6 50% SPWTO, 50% Poly-Pale | ASTM Specifications |
|---|---|---|---|---|
| Soap pH | 11.5 | 11.2 | 11.0 | na |
| Residue, % | 59.6 | 64.0 | 61.7 | 57 min. |
| Sieve, % | 0.036 | 0.007 | 0 | 0.1 max. |
| Viscosity (SFS), 25° C. | 36 | 50 | 41 | 20–100 |
| Cement Mixing | 0.06 | 0.30 | 0.40 | 2.0 max. |
| 1 Day Settlement, % | 0.80 | 0.40 | 0.10 | 1.0 max. |
| Penetration, 100 g, 5 sec, 25° C. | 45 | 46 | 44 | 40–90 |
| Softening Point, ° C. | 53 | 52.5 | 50.2 | na |
| Ductility, 25° C. | 105+ | 85 | 90 | 40 min. |

[1]Formulations contain 61 wt. % asphalt

The data in Tables 1 and 2 indicate that the compositions of the invention produce emulsions that meet all ASTM specifications and are comparable in performance to the widely used Vinsol® resin.

While the invention has been described with respect to specific embodiments, it should be understood that they are not intended to be limiting and that many variations and modifications are possible without departing from the scope of this invention.

What is claimed is:

1. An asphalt emulsion containing an emulsifier comprising an alkali metal or ammonium salt of solidified pyrolytic wood tar oil.

2. The asphalt emulsion of claim 1 wherein the solidified pyrolytic wood tar oil has a Fisher-Johns softening point of from about 100° C. to about 170° C.

3. The asphalt emulsion of claim 1 wherein the solidified pyrolytic wood tar oil has a Fisher-Johns softening point of from about 140° C. to about 160° C.

4. The asphalt emulsion of claim 1 wherein the solidified pyrolytic wood tar oil has a weight average molecular weight of from about 1,500 to about 4,500.

5. The asphalt emulsion of claim 1 wherein the solidified pyrolytic wood tar oil has a weight average molecular weight of from about 3,000 to about 4,000.

6. The asphalt emulsion of claim 1 wherein the solidified pyrolytic wood tar oil has a number average molecular weight of from about 500 to about 1,000.

7. The asphalt emulsion of claim 1 wherein the solidified pyrolytic wood tar oil has a number average molecular weight of from about 750 to about 1,000.

8. The asphalt emulsion of claim 1 wherein the solidified pyrolytic wood tar oil has a glass transition temperature ($T_g$) of from about 30° C. to about 100° C.

9. The asphalt emulsion of claim 1 wherein the emulsifier further comprises the alkali metal salt of a rosin having an acid number of at least about 100.

10. The asphalt emulsion of claim 1 wherein the emulsifier further comprises the alkali metal salt of a rosin having an acid number of at least about 150.

11. The asphalt emulsion of claim 1 wherein the emulsifier further comprises the alkali metal salt of a rosin having an acid number of at least about 200.

12. The asphalt emulsion of claim 9 wherein the rosin comprises at least one member selected from the group consisting of natural rosin, fortified rosin, polymerized rosin, hydrogenated rosin, disproportionated rosin and esterified rosin.

13. The asphalt emulsion of claim 9 wherein the rosin comprises fortified rosin that is the adduct reaction product of rosin and an α,β-unsaturated carboxylic acid selected from the group consisting of fumaric acid, maleic acid, maleic anhydride, acrylic acid, itaconic acid, itaconic anhydride, citraconic acid, citraconic anhydride, and mixtures thereof.

14. The asphalt emulsion of claim 9 wherein the rosin comprises fortified rosin that is the adduct reaction product of rosin and fumaric acid.

15. The asphalt emulsion of claim 9 wherein the rosin comprises fortified rosin that is the adduct reaction product of rosin and fumaric acid having an acid number of from about 150 to about 210.

16. The asphalt emulsion of claim 9 wherein the rosin comprises fortified rosin that is the adduct reaction product of rosin and fumaric acid having a combined fumaric acid level of from about 1% to about 16% by weight based on the weight of the fortified rosin.

17. The asphalt emulsion of claim 9 wherein the rosin comprises fortified rosin that is the adduct reaction product of rosin and fumaric acid having a combined fumaric acid level of from about 1% to about 10% by weight based on the weight of the fortified rosin.

18. The asphalt emulsion of claim 9 wherein the rosin comprises fortified rosin that is the adduct reaction product of rosin and fumaric acid having a combined fumaric acid level of from about 1% to about 5% by weight based on the weight of the fortified rosin.

19. The asphalt emulsion of claim 9 wherein the rosin comprises polymerized rosin.

20. The asphalt emulsion of claim 19 wherein the polymerized rosin comprises about 30 to about 90 wt. percent rosin acid dimer.

21. The asphalt emulsion of claim 1 wherein the alkali metal is sodium.

22. The asphalt emulsion of claim 9 wherein the ratio of the solidified pyrolytic wood tar to the rosin on a weight basis is from about 1:3 to about 3:1.

23. The asphalt emulsion of claim 9 wherein the ratio of the solidified pyrolytic wood tar to the rosin on a weight basis is from about 1:2 to about 2:1.

24. The asphalt emulsion of claim 9 wherein the ratio of the solidified pyrolytic wood tar to the rosin on a weight basis is from about 1:1.5 to about 1.5:1.

25. The asphalt emulsion of claim 1 wherein the solidified pyrolytic wood tar oil has a Fisher-Johns softening point of from about 100° C. to about 170° C., a weight average molecular weight of from about 1,500 to about 4,500, a number average molecular weight of from about 500 to about 1,000, a glass transition temperature ($T_g$) of from about 30° C. to about 100° C., and wherein the alkali metal is sodium.

26. The asphalt emulsion of claim 1 wherein the emulsifier further comprises the alkali metal salt of a rosin having an acid number of at least about 100 selected from the group consisting of natural rosin, fortified rosin, polymerized rosin, hydrogenated rosin, disproportionated rosin and esterified rosin, and wherein the solidified pyrolytic wood tar oil has a Fisher-Johns softening point of from about 100° C. to about 170° C., a weight average molecular weight of from about 1,500 to about 4,500, a number average molecular weight of from about 500 to about 1,000, and a glass transition temperature ($T_g$) of from about 30° C. to about 100° C.

27. A resinous composition comprising a first component selected from the group consisting of solidified pyrolytic wood tar oil and salts thereof and a second component selected from the group consisting of rosins and salts thereof.

28. The resinous composition of claim 27 wherein the salts are salts of alkali metal cations.

29. The resinous composition of claim 27 wherein the solidified pyrolytic wood tar oil has a Fisher-Johns softening point of from about 100° C. to about 170° C., a weight average molecular weight of from about 1,500 to about 4,500, a number average molecular weight of from about 500 to about 1,000, and a glass transition temperature ($T_g$) of from about 30° C. to about 100° C.

30. The resinous composition of claim 27 wherein the rosins have an acid number of at least about 100.

31. The resinous composition of claim 27 wherein the rosins comprise at least one member selected from the group consisting of natural rosin, fortified rosin, polymerized rosin, hydrogenated rosin, disproportionated rosin and esterified rosin.

32. The resinous composition of claim 27 wherein the rosins comprise fortified rosin that is the adduct reaction product of rosin and an α,β-unsaturated carboxylic acid selected from the group consisting of fumaric acid, maleic acid, maleic anhydride, acrylic acid, itaconic acid, itaconic anhydride, citraconic acid, citraconic anhydride, and mixtures thereof.

33. The resinous composition of claim 27 wherein the rosins comprise fortified rosin that is the adduct reaction product of rosin and fumaric acid.

34. The resinous composition of claim 27 wherein the rosins comprise fortified rosin that is the adduct reaction product of rosin and fumaric acid having an acid number of from about 150 to about 210.

35. The resinous composition of claim 27 wherein the rosins comprise fortified rosin that is the adduct reaction product of rosin and fumaric acid having a combined fumaric acid level of from about 1% to about 16% by weight based on the weight of the fortified rosin.

36. The resinous composition of claim 27 wherein the rosins comprise fortified rosin that is the adduct reaction product of rosin and fumaric acid having a combined fumaric acid level of from about 1% to about 10% by weight based on the weight of the fortified rosin.

37. The resinous composition of claim 27 wherein the rosins comprise fortified rosin that is the adduct reaction product of rosin and fumaric acid having a combined fumaric acid level of from about 1% to about 5% by weight based on the weight of the fortified rosin.

38. The resinous composition of claim 27 wherein the rosins comprise polymerized rosin.

39. The resinous composition of claim 38 wherein the polymerized rosin comprises about 30 to about 90 wt. percent rosin acid dimer.

40. The resinous composition of claim 27 wherein the ratio of the solidified pyrolytic wood tar oil to the rosin on a weight basis is from about 0.8:1 to about 2.3:1.

41. The resinous composition of claim 27 wherein the ratio of the solidified pyrolytic wood tar oil to the rosin on a weight basis is from about 1:1 to about 2:1.

42. The resinous composition of claim 27 wherein the ratio of the solidified pyrolytic wood tar oil to the rosin on a weight basis is from about 1.5:1 to about 2:1.

43. The resinous composition of claim 27 having an acid number of from about 100 to about 130 and a Ring & Ball Softening Point of from about 110° C. to about 140° C.

44. The resinous composition of claim 27 wherein the rosins comprise at least one member selected from the group consisting of natural rosin, fortified rosin, polymerized rosin, hydrogenated rosin, disproportionated rosin and esterified rosin, the ratio of the solidified pyrolytic wood tar oil to the rosin on a weight basis is from about 0.8:1 to about 2.3:1, and wherein the resinous composition has an acid number of from about 100 to about 130 and a Ring & Ball Softening Point of from about 110° C. to about 140° C.

45. A method for preparing an asphalt emulsion comprising dissolving ingredients comprising a rosin having an acid number of at least about 100 and solidified pyrolytic wood tar oil in an aqueous solution of alkali metal or ammonium hydroxide to form an aqueous solution of emulsifier, mixing the aqueous solution of emulsifier with asphalt to form a mixture, and milling the mixture to form an emulsion of the asphalt.

46. The method of claim 45 wherein the rosin comprises fortified rosin that is the adduct reaction product of rosin and an α,β-unsaturated carboxylic acid selected from the group consisting of fumaric acid, maleic acid, maleic anhydride, acrylic acid, itaconic acid, itaconic anhydride, citraconic acid, citraconic anhydride, and mixtures thereof.

47. The method of claim 45 wherein the rosin comprises fortified rosin that is the adduct reaction product of rosin and fumaric acid.

48. The method of claim 45 wherein the rosin comprises polymerized rosin containing from about 30 to about 90 wt. percent rosin acid dimer.

49. The method of claim 45 wherein the alkali metal is selected from the group consisting of lithium, sodium and potassium.

50. The method of claim 45 wherein the alkali metal is sodium.

51. The method of claim 45 wherein the rosin comprises at least one member selected from the group consisting of natural rosin, fortified rosin, polymerized rosin, hydrogenated rosin, disproportionated rosin and esterified rosin.

* * * * *